Aug. 20, 1935.    W. E. ZINNBAUER    2,012,032
LOCK WASHER
Original Filed April 30, 1930    2 Sheets-Sheet 2

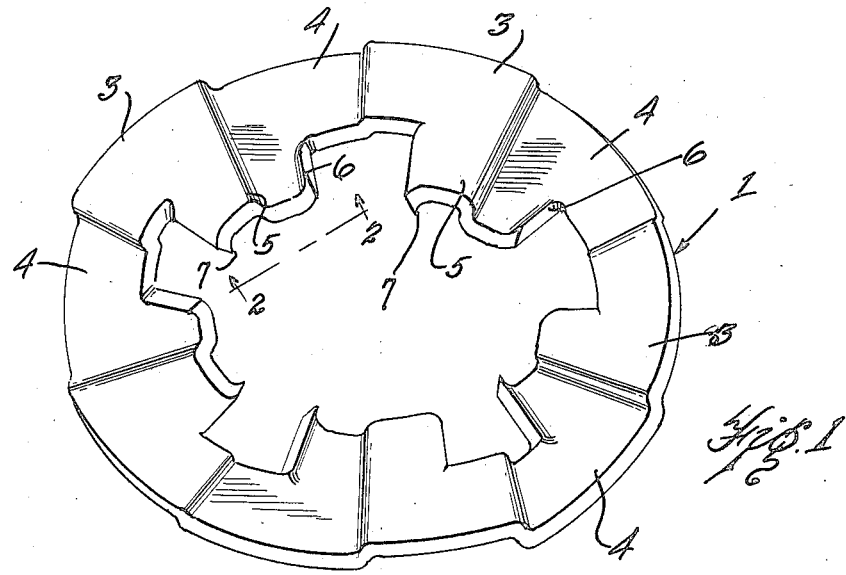
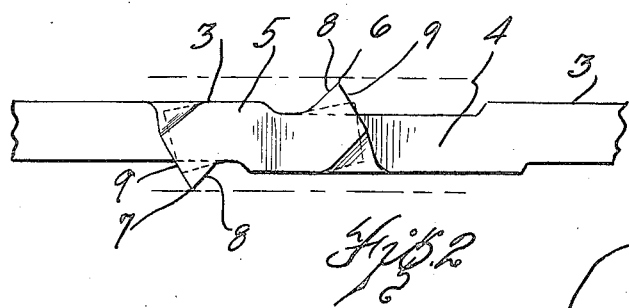
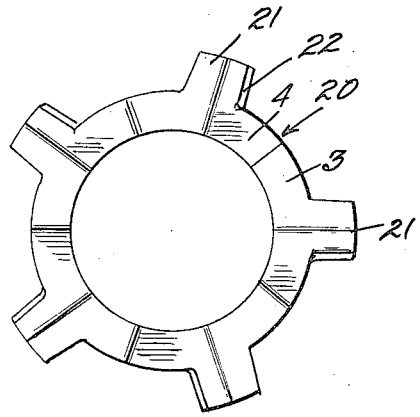
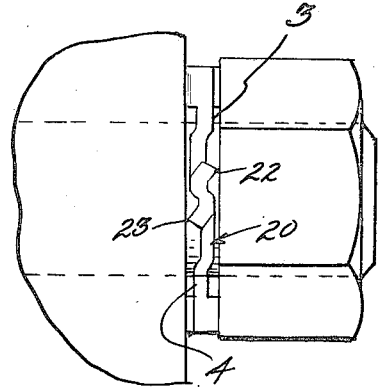

INVENTOR.
WILLIAM E. ZINNBAUER
BY
ATTORNEY.

Patented Aug. 20, 1935

2,012,032

UNITED STATES PATENT OFFICE 2,012,032

LOCK WASHER

William E. Zinnbauer, Detroit, Mich.

Continuation of application Serial No. 448,711,
April 30, 1930. This application August 11,
1932, Serial No. 628,557

17 Claims. (Cl. 151—35)

This invention relates to lock washers of sheet metal type of an improved construction to be utilized on a bolt between a work body and a nut to prevent the nut from unthreading on the bolt and is a continuation of my application Serial No. 448,711, filed April 30, 1930.

An object of the device is to provide a lock washer provided in its main body with alternately raised and depressed portions and having integral portions extending from the body of the washer, the same having resilient teeth disposed in opposite directions, one set of teeth engaging the nut and the teeth extending in the opposite direction engaging the work.

Another object of the invention is to provide a lock washer, the body portion of which is formed with alternate raised and depressed portions and resilient teeth formed integrally with the body portion and extending therefrom, the cutting edges of the teeth extending in opposite directions and in a plane higher and lower than the alternate raised and depressed portions of the body.

Another object of the invention is to provide a lock washer, the body portion of which is formed with alternate raised and depressed portions to limit the movement of the nut toward the work so that the relation of the cutting edges of the teeth to the body portion is always at an angle greater than zero degrees.

With the well known flat sheet metal type of lock washer having struck up teeth the said teeth are pressed to the plane of the washer between the work and the nut in turning the nut to place. This is likewise practically true of the common split ring form of washer in which the two ends are reversely bent out of the plane of the washer. Such previous structures do not provide a highly efficient means for preventing the unthreading of the nut as in both the structures mentioned the teeth are so flattened by the nut that the angle of the tooth engaging the nut or the work is so near the plane of the surface contacted thereby as to materially detract from its efficiency. In my improved construction having the alternate raised and depressed portions connected by a part practically at a right angle to the plane of the washer and having a tooth struck up from the bottom of the depressions, the tooth is always in engagement with the work at a materially greater angle than has heretofore been the case and therefore is more highly efficient in use.

With these and other objects in view the several features of the invention are hereinafter more fully described and claimed, and the preferred form of construction by which these objects are attained is shown in the accompanying drawings in which—

Fig. 1 is a perspective view of my improved lock washer.

Fig. 2 is an end view of one of the lugs looking from line 2—2 of Fig. 1.

Fig. 3 is a plan view of a modified form of lock washer.

Fig. 4 is an assembly of a lock washer with a nut and a work body before the nut has been screwed down.

Figure 5:
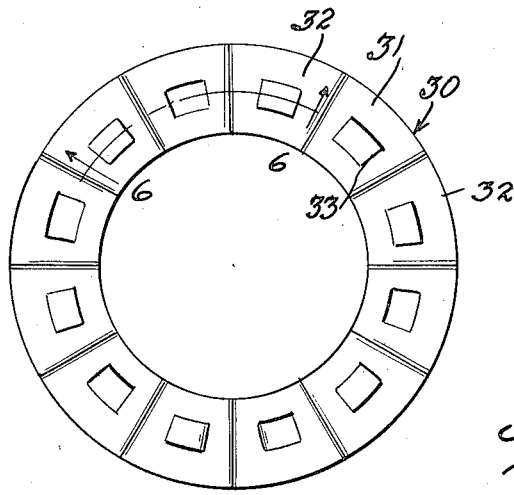
Fig. 5 is a top plan view of a modified form of lock washer.

Referring now to the drawings wherein like characters represent like parts throughout the several views, the lock washer 1 comprises a circular body portion 2 composed of alternate raised and depressed portions 3 and 4 respectively. Extending inwardly from the body portion 2 are the portions or lugs 5 the edges of which are alternately raised and depressed as indicated at 6 and 7.

It is to be understood that the inwardly extending portions 5 may be provided with alternately raised and depressed prongs instead of edges but in practice it has been found that the cutting edges are more practical in use. As best seen in Fig. 1 it will be seen that the teeth 6 are approximately centrally located in relation to the depressed portions 4, and the cutting teeth 7 are approximately centrally located in relation to the raised portions 3.

As best seen in Fig. 2 the enclosed angle between the face 8 and the face 9, the meeting edge of which acts as a tooth for engaging the work or the nut, is somewhat less than ninety degrees. As will also be seen in Fig. 2 the resilient tooth 6 is above the plane of the upper face of the raised portion 3 and likewise the resilient tooth 7 is below the plane of the lower face of the depressed portion 4. When the nut has been drawn down to contact with the upper face of the raised portion 3 and the work is in contact with the lower face of the depressed portion 4 the resilient teeth 6 and 7 will assume a position approximately as shown by dotted lines in Fig. 2. This change in angular position of the tooth tends to shorten the distance between the cutting edge of the tooth and line of contact of the tooth body with the nut or work as the case may be. This is due to the fact that the fulcrum point changes as the tooth is deflected.

The raised portions 3 and the depressed portions 4 will resist any further movement of the nut toward the work thus permitting the faces 8 of the resilient teeth 6 and 7 to engage the nut and the work at an angle somewhat greater than zero degrees.

The construction of the body portion 2, due to the alternate raised and depressed portions, is of such character as to prevent deformation of the body portion 2 to any material extent as the connecting portion between two oppositely disposed depressions provides a series of solid metal parts in contact at opposite ends or surfaces with the respective faces of the nut and of the work.

Referring now to Figs. 3 and 4 the body portion 20 of the lock washer is constructed substantially as heretofore described. The body portion 20 is provided with outwardly extending portions or lugs 21 the same being integral with the body portion 20. The outwardly extending portions 21 are provided with alternate raised and depressed resilient teeth 22 and 23 respectively. The teeth 22 are in a plane above the upper face of the raised portions 3 and the teeth 23 are in a plane below the lower face of the depressed portions 4 thus permitting the nut and the work to come in contact with the teeth 22 and 23 before the nut comes into contact with the raised portions 3 and the work in contact with the depressed portions 4.

This form of washer is equal in efficiency and equivalent in all general respects to the form shown in Figs. 1 and 2, the only difference being that the teeth are formed by outwardly extending portions 21 instead of inwardly extending portions 5 and preferably in either form the cutting edges of the toothed portions occupy a plane parallel with the plane of the washer whereby cutting edges are provided rather than cutting points as has sometimes been the practice in other forms of lock washers.

As best illustrated in Fig. 4, it is obvious that when the nut is threaded on the bolt the nut will press the tongues 22 down toward the body portion 20 and the work will press the resilient teeth 23 up toward the body portion 20. The resiliency in the teeth 22 and 23 will cause them to engage with the nut and the work to prevent the nut from turning in relation to the work. As shown in this figure the nut has just been brought into contact with the washer so that the teeth are still above and below the plane of the main body portion. If undue pressure is applied to the face of the washer by threading the nut down on the bolt the threads in either the bolt or the nut are apt to be stripped off before the body portion of the washer is flattened out.

Figure 6:
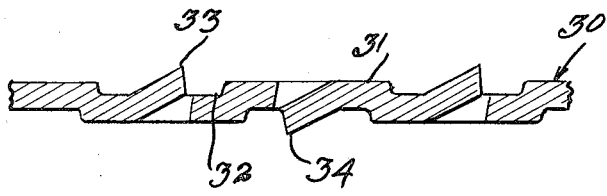
Fig. 6 is a developed section taken on line 6—6 of Fig. 5.

Referring now to Figs. 5 and 6, it will be seen that the body portion 30 is provided with the alternate raised and depressed portions 31 and 32 respectively, the raised portions 31 being provided centrally thereof with the upturned teeth 33 while the depressed portions 32 are provided with the depressed teeth 34 extending in the opposite direction to the teeth 33. The action of this form of washer is the same as the form heretofore described, the only difference being that the teeth for engaging the nut and the work body are provided in the main body portion of the washer instead of extending therefrom.

Figure 7:
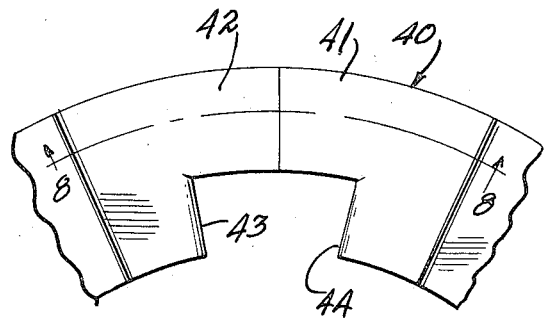
Fig. 7 is a partial top plan view of another modified form of washer.
Figure 8:
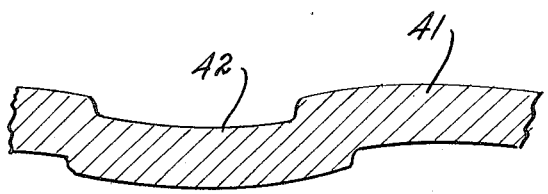
Fig. 8 is a section taken on line 8—8 of Fig. 7.

In Figs. 7 and 8 it will be seen that the washer 40 is substantially the same as shown in Fig. 1 the difference being that the raised portion 41 in the body is provided with a crowned surface while the depressed portion 42 is provided with a reversely crowned surface the purpose of the same being to give an added resiliency to the body of the washer.

A further feature is secured by the provision of these crowned surfaces from which the toothed portions are struck in that through drawing the nut down onto the washer a spring tension is created between the nut and the work and at the same time the straightening out of these crowned surfaces tends to force the tooth outwardly from the recess to engagement with the surface of the nut or work respectively.

It will be noted from Fig. 7 that the depressed portion 42 is provided with the teeth 43 while the raised portion 41 is provided with the teeth 44. In either form of construction of the washer described it is to be noted that the toothed portions, probably best illustrated in Fig. 1 have one entire side integral with the adjacent body. Heretofore it has commonly been the practice to slit the metal and thus separate the outbent portion of the tooth from the body. Such previous construction has the fault of permitting the end of the tooth to break off from the base. By my improved construction the side of the tooth adjacent the body is integral with the body throughout the length of the tooth which is therefore strengthened and sustained by the body.

It is thus clearly seen that the lock washer herein described will always have cutting teeth engaging the nut and the work at an angle materially greater than zero degrees to a transverse plane extending at right angles to the bolt. In practice and as will be observed from Fig. 2 the angle of the toothed body is normally about 45 degrees to the plane of the washer and this angle is changed to in the neighborhood of 30 degrees upon tightening the nut to tight engagement with the washer.

While the invention is not limited to such specific angularity of the teeth the feature of construction permitting the cutting tooth to lie at an angle of approximately thirty degrees to the plane of the washer while under pressure of the nut is important for the reason that there is much greater "snubbing" effect produced than is the case where the teeth flatten to the plane of the washer or to practically a zero degree to the face of the work or the nut contacting the tooth. In such former constructions where the teeth flatten to the plane of the work the nut must loosen to some extent before the teeth can function to prevent rotation.

From the foregoing description it will be evident that the structure described provides a lock washer by which the various objects of the invention as heretofore set forth are attained.

Having thus fully described my invention, its utility and mode of operation, what I claim and desire to secure by Letters Patent of the United States is—

1. In a lock washer, a body portion provided with alternate raised and depressed portions, lugs extending radially from the body portion and provided at their side edges with oppositely extending teeth, said lugs each having similar portions respectively on the plane of a raised and a depressed body portion, the tooth of one edge of each lug being in a plane higher than the raised portion of the body and the opposite tooth of the lug being in a plane lower than the depressed portion in the body.

2. In a lock washer, a body portion provided with raised and depressed portions, lugs extending radially from the body portion, and provided on their edges with oppositely extending teeth, the set of teeth extending from the depressed portion of the body being in a plane higher than the raised portion of the body, the other set of teeth being in a plane lower than the depressed portion of the body.

3. In a lock washer, a body portion having alternate raised and depressed portions therein, the metal connecting the respective ends of the raised and depressed portions being practically at a right angle to the plane thereof, and teeth struck from the raised and depressed portions, the cutting edge of the tooth struck from a raised portion terminating in a plane below the surface of the adjacent depressed portion and the tooth struck from a depressed portion terminating above the surface of the adjacent raised portion, the teeth struck from adjacent raised and depressed portions extending in opposite directions respectively.

4. In a lock washer, a body of ring-like form having alternate portions thereof struck out in opposite directions from a center plane forming alternate depressions in the opposite faces of the washer, the outer surfaces of the portions forming the depressions being convex in form and the metal of the body connecting the said alternate portions lying at approximately a right angle to the center plane of the washer to withstand the strains to which the washer is subjected without collapse of the pressed out portions, and teeth formed on the said body extending from a depressed portion thereof to beyond the plane occupied by the adjacent convex portion.

5. In a lock washer, a body portion having successive parts thereof alternately pressed outwardly from the center plane providing oppositely disposed depressions, the open faces of which are on alternate sides of the body and teeth struck upwardly from the bottom wall of each depression and at one side of the body with the cutting edges of the teeth occupying a plane parallel to the plane of the body and the body side of the tooth being integrally connected with the body practically through its length, said teeth projecting normally to beyond the plane of the surface of the body toward which it is struck to relatively engage the nut and work under spring pressure unaffected by the pressure engagement of the nut and work with the washer.

6. In a lock washer for use on a threaded bolt between a nut and a work body, a body of ring-like form having alternate portions thereof struck out in opposite directions from the center plane forming depressions opening in alternate relation through opposite faces of the washer, the bottoms of the depressions being arcuate in form having a long radius and the metal of the body connecting said arcuate portions lying at approximately a right angle to the center plane of the washer, said structure providing a washer compressible in a direction at a right angle to a center plane thereof until the opposite end surfaces of the connecting surfaces of the connecting portions are in engagement respectively with the nut and the work whereby the nut is under spring pressure tending to frictionally resist rotation thereof, and teeth carried by the body portion to engage both the surface of the nut and of the work in contact with the washer also tending to prevent rotation of the nut or washer relative to the bolt or the work.

7. The combination with a nut, a threaded member to receive the same, and a work body, of a lock washer having a body portion formed with alternate raised and depressed parts of a character permitting the said body to be compressed through pressure of the nut thereagainst in threading the same on said threaded member, and teeth struck outwardly from the bottoms of said depressions, the cutting edges of which are on a radial line of the washer and occupying a plane parallel with the center plane of the washer, said cutting edges engaging the nut or the work as the case may be under spring pressure.

8. In a lock washer, the combination with a nut, a threaded member to receive the same, and a work body, of a body member apertured to receive the threaded member and having radially disposed alternate raised and depressed portions, the outer surfaces of which are respectively engaged by the work or the nut when the nut is threaded on the said threaded member to engagement therewith, and teeth struck outwardly from the bottom of each depression toward the opposite side of the washer, the cutting edges of which are radially disposed and occupy a plane practically parallel with the center plane of the washer and normally extending to beyond the face of the washer toward which they are struck.

9. In a lock washer for use between a nut and a work body, a body member of spring sheet metal shaped to provide uniform alternate raised and depressed portions of a shape and arrangement to permit a limited compression of the body of the washer through the turning of the nut under pressure thereagainst, and teeth at one side of the said body portion having cutting edges radially disposed to engage the surface of the nut or of the work under spring pressure, the arrangement being such that the compression of the body tends to increase the pressure with which the teeth engage the nut or the work.

10. In a lock washer for use between a nut and work body, a body of spring metal having successive parts thereof alternately pressed outwardly from a center plane providing oppositely disposed depressions, the bottoms of the said depressions extending radially to one side of the body, and teeth struck up from said radial extensions toward the opposite face of the washer providing a construction in which the cutting edge of the tooth engages the nut or the work as the case may be while the base of each tooth is supported throughout its width by the other member.

11. In a lock washer for use between a nut and work body, a body of spring metal having successive parts thereof alternately pressed outwardly from the center plane providing oppositely disposed depressions, the bottoms of which are respectively engaged by the nut and the work body, radial extensions in the plane of the bottom of the said depressions, the edge of the extension from one set of depressions being struck outwardly providing a series of teeth for engagement with the nut and the opposite edges of the extensions from the other set of depressions also being struck outwardly providing a series of oppositely disposed teeth for engagement with the work, the cutting edges of the teeth occupying a plane parallel with the center plane of the body of the washer and normally extending to beyond the plane occupied by the bases of the depressions on the side of the washer toward which the teeth are struck.

12. In a lock washer, a body portion having successive parts thereof alternately pressed outwardly from a center plane providing successive opposed depressions connected by a portion of the body member lying practically at a right angle to the lines of force applied to opposite side faces of the body and teeth of a length less than the width of the depression circumferentially of the washer struck upwardly from the bottom of each depression to beyond the plane of the surface of an adjacent part whereby the same may respectively engage the nut and work under spring pressure unaffected by the pressure engagement of the nut and work on the opposite faces of the washer.

13. In a lock washer, the combination with a nut, a threaded member to receive the same, and a work body, of a washer like body member having alternate raised and depressed portions struck outwardly of the opposite side faces of the washer, the walls connecting the alternate raised and depressed portions lying approximately at a right angle to the center plane of the washer, the faces of the said raised and depressed portions between the right angle portions being respectively oppositely curved providing a structure compressible to the degree permitted by the said curved faces and limited by the said right angled connecting portions whereby the said body portion is prevented from being flattened, and teeth struck up from the bottom of each depression and extending outwardly in respect thereto to engagement under spring pressure with the surface of the work or the nut as the case may be.

14. In a lock washer, a body portion of ring like form having alternate portions thereof struck outwardly in opposite directions from a center plane of the body to provide oppositely disposed depressions connected together with an integral wall, the length of which transversely of the body from face to face is greater than the thickness of the metal and supporting the said depressions from deformation through pressure applied thereto in use between a nut and a work piece, said body having integral radial lugs extending to one side thereof at alternate integral walls and said walls extending centrally across the companion lugs whereby a portion of each lug on one side of the wall occupies the plane of one depression and a portion thereof on the opposite side of the wall occupies the plane of the other depression, said portions of the lugs respectively having edge portions struck in a direction outwardly of each depression to provide cutting teeth terminating in a plane beyond the plane of the other portion of the said lug.

15. In a lock washer, a body of ring like form having successive parts thereof pressed outwardly in alternate relation from a center plane of the body providing radially disposed depressions having flat faces on opposite sides of the washer parallel with the center plane of the washer and teeth of a length less than the width of the depressions circumferentially of the washer struck outwardly from one side of the bottom of each depression and extending to beyond the plane of the base of an adjacent oppositely disposed depression whereby successive teeth may respectively engage the nut and work under spring pressure unaffected by the pressure of engagement of the nut and work with the respectively oppositely disposed bases of the depressions.

16. In a lock washer, an annular body portion having successive parts pressed outwardly in alternate relation from the center plane of the body providing radially disposed depressions having outer flat faces parallel with the center plane of the body and connected by an intervening body portion extending transversely of the plane of the body to sustain the depressions against deformation by pressure applied to the washer in use between a nut and a work piece, and prongs integral with the depressions and extending outwardly in respect to the open side of each depression to engagement respectively with the nut and work.

17. In a lock washer, an annular body portion having a series of depressions formed therein each in alternate relation being struck outwardly from opposite sides of the body portion providing flat faces on opposite sides parallel with the center plane of the body, and a plurality of work engaging prongs integral with the body each extending from the bottom of a depression in a direction toward the opposite side of the body thus providing alternately disposed radial locking edges each normally projecting beyond a plane coincident with the outer face of an adjacent oppositely disposed depression.

WILLIAM E. ZINNBAUER.